United States Patent
Okada et al.

(10) Patent No.: US 7,843,762 B2
(45) Date of Patent: Nov. 30, 2010

(54) RAM CONTROL DEVICE AND MEMORY DEVICE USING THE SAME

(75) Inventors: Tomokazu Okada, Kyoto (JP); Takashi Kira, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 485 days.

(21) Appl. No.: 11/997,361

(22) PCT Filed: Jul. 27, 2006

(86) PCT No.: PCT/JP2006/314860

§ 371 (c)(1),
(2), (4) Date: Jan. 30, 2008

(87) PCT Pub. No.: WO2007/018043

PCT Pub. Date: Feb. 15, 2007

(65) Prior Publication Data

US 2010/0095056 A1    Apr. 15, 2010

(30) Foreign Application Priority Data

Aug. 5, 2005  (JP) ............................. 2005-227756
May 25, 2006 (JP) ............................. 2006-144790
May 29, 2006 (JP) ............................. 2006-147550

(51) Int. Cl.
*G11C 8/00* (2006.01)

(52) U.S. Cl. .............................. 365/233.1; 365/233.11; 365/233.14; 365/233.15; 365/154; 365/156

(58) Field of Classification Search .............. 365/233.1, 365/233.11, 233.14, 233.15, 154, 156
See application file for complete search history.

(56) References Cited

U.S. PATENT DOCUMENTS

| 4,240,138 | A |  | 12/1980 | Chauvel |
| 4,956,820 | A | * | 9/1990 | Hashimoto .................. 365/222 |
| 6,437,619 | B2 |  | 8/2002 | Okuda et al. |
| 6,512,711 | B1 |  | 1/2003 | Wright et al. |
| 6,895,522 | B2 |  | 5/2005 | Johnson et al. |
| 7,133,996 | B2 |  | 11/2006 | Ikeda et al. |
| 7,184,359 | B1 | * | 2/2007 | Bridgewater et al. ... 365/189.16 |
| 7,542,365 | B2 | * | 6/2009 | Bodnar ....................... 365/221 |

FOREIGN PATENT DOCUMENTS

| JP | 57-003155 | 1/1982 |
| JP | 61-005363 | 1/1986 |
| JP | 06-161870 | 6/1994 |
| JP | 10-105505 | 4/1998 |
| JP | 2000-341255 | 12/2000 |
| TW | 591658 | 6/2004 |
| TW | 594743 | 6/2004 |

* cited by examiner

*Primary Examiner*—Pho M Luu
(74) *Attorney, Agent, or Firm*—Fish & Richardson P.C.

(57) ABSTRACT

In a RAM control device, an arbiter circuit is means for generating BUSY1 and BUSY2 of exclusive logic with CLK1 and CLK2 so as to give a right to access RAM3 to a host which has transmitted the first access clock and requesting a one-shot circuit to generate RAMCLK for deciding the timing to access the RAM3. The one-shot circuit is means for generating one pulse of RAMCLK with CLKRQ from the arbiter circuit and transmitting it to the RAM3. This configuration suppresses increase of the device size and cost and enables appropriate control of access to the RAM according to the access clocks of two systems inputted asynchronously.

16 Claims, 9 Drawing Sheets (a) STATE DIAGRAM (b) LOGIC VALUE TABLE

|  | BUSY2 SIGNAL | BUSY1 SIGNAL |
|---|---|---|
| STBY STATE {00} | L(0) | L(0) |
| BUSY1 STATE {01} | L(0) | H(1) |
| BUSY2 STATE {10} | H(1) | L(0) |

(a) 1ST EXAMPLE (b) 2ND EXAMPLE (a) STATE DIAGRAM (b) LOGIC VALUE TABLE

|  | DBUSY SIGNAL | MBUSY2 SIGNAL | MBUSY1 SIGNAL |
|---|---|---|---|
| STBY STATE {000} | L(0) | L(0) | L(0) |
| MBUSY1 STATE {001} | L(0) | L(0) | H(1) |
| MBUSY2 STATE {010} | L(0) | H(1) | L(0) |
| DBUSY STATE {100} | H(1) | L(0) | L(0) |

RAM CONTROL DEVICE AND MEMORY DEVICE USING THE SAME

TECHNICAL FIELD

The present invention relates to a RAM control device for controlling access to a RAM (random-access memory), and to a memory device employing it.

BACKGROUND ART

Conventionally, in cases where access to a RAM needs to be controlled according to two asynchronously inputted access clocks, it is common to adopt a dual port RAM as a memory device. A dual port RAM denotes a RAM having two input/output interfaces (typically one for writes and one for reads) with respect to the storage portion within the memory device.

As one conventional technology related to the present invention, there is disclosed and proposed a dual port RAM circuit in which a single-port RAM portion is accessed on a time-division basis. In this dual port RAM, read and write control signals from two control devices are each formed into a single-clock-period-wide control signal synchronous with an internal clock and, when two control signals each from one of the two control devices happen to be synchronized to have the same timing, one of them is delayed by one clock period (see Patent Document 1 listed below).

As another conventional technology related to the present invention, there is disclosed and proposed a system control device that copes with clock asynchronism within the device. In this system control device, a clock for a firmware control portion is integrated into a clock for a main signal control portion by a clock frequency arbitration portion, and, according to a timing signal from a timing signal generation portion, access to a data storage portion by the main signal control portion and the firmware control portion is controlled on a time-division basis so as not to contend (see Patent Document 2 listed below).

Patent Document 1: JP-A-H06-161870

Patent Document 2: JP-A-2000-341255

DISCLOSURE OF THE INVENTION

Problems to be Solved by the Invention

Certainly, adopting a dual-port RAM as a memory device makes it possible to appropriately control access to the RAM according to two asynchronously inputted access clocks.

Disadvantageously, however, compared with a single-port RAM, which has only one input/output interface, a dual-port RAM has a larger chip area, and thus its use leads to increases in device scale and cost.

On the other hand, if instead a single-port RAM is used as a memory device, since the two access clocks are asynchronous, depending on their input timing, access to the RAM may not be performed normally.

Incidentally, according to the conventional technology of Patent Document 1, the RAM is accessed not by use of external control signals as they are, but by use of the external control signals as integrated into internal clock signals C1 and C2. Accordingly, the conventional technology of Patent Document 1 additionally requires an oscillation circuit for generating the internal clock signals C1 and C2. This leads to increases in device scale and cost, and in addition the performance of the oscillation circuit may affect the performance of the overall operation.

On the other hand, according to the conventional technology of Patent Document 2, the RAM is accessed by use of one control signal (e.g., a low-frequency clock) as integrated into another control signal (e.g., a high-frequency clock). Accordingly, the conventional technology of Patent Document 2 can be applied only in cases where the second control signal, into which the first control signal needs to be integrated, remains alive all the time.

An object of the present invention is to provide a RAM control device that can control access to a RAM appropriately according to two asynchronously inputted access clocks without inviting undue increases in device scale and cost, and to provide a memory device employing it.

Means for Solving the Problem

To achieve the above object, according to one aspect of the present invention, a RAM control device includes an arbiter circuit and a one-shot circuit and controls access to a RAM according to two asynchronously inputted access clocks, namely first and second access clocks. Here, the arbiter circuit serves as means for, on one hand, generating first and second busy signals that are logically exclusive with each other according to the first and second access clocks in order to permit whichever host outputs an access clock first to access the RAM and, on the other hand, requesting the one-shot circuit to generate a RAM clock for deciding timing of access to the RAM. On the other hand, the one-shot circuit serves as means for generating one pulse as the RAM clock according to a clock request signal from the arbiter circuit to feed the pulse to the RAM. (A first configuration.)

In the RAM control device having the first configuration described above, the RAM clock may have a period equal to or less than one-half of the period of whichever of the first and second access clocks is faster. (A second configuration.)

In the RAM control device having the first or second configuration described above, the arbiter circuit may be provided with: a first D flip-flop that receives at the clock input terminal thereof the first access clock, that receives at the data input terminal thereof a predetermined logic signal, that receives at the reset terminal thereof a first request reset signal, and that outputs at the output terminal thereof a first request signal; a first AND circuit that receives at the first input terminal thereof the first busy signal, that receives at the second, inverting, input terminal thereof the RAM clock, and that outputs at the output terminal thereof the first request reset signal; a second AND circuit that receives at the first input terminal thereof the first request signal, that receives at the second, inverting, input terminal thereof the second busy signal, and that outputs at the output terminal thereof a first access start signal; a second D flip-flop that receives at the clock input terminal thereof the RAM clock, that receives at the data input terminal thereof a predetermined logic signal, that receives at the set input terminal thereof the first access start signal, and that outputs at the output terminal thereof the first busy signal; a third D flip-flop that receives at the clock input terminal thereof the second access clock, that receives at the data input terminal thereof a predetermined logic signal, that receives at the reset terminal thereof a second request reset signal, and that outputs at the output terminal thereof a second request signal; a third AND circuit that receives at the first input terminal thereof the second busy signal, that receives at the second, inverting, input terminal thereof the RAM clock, and that outputs at the output terminal thereof the second request reset signal; a fourth AND circuit that receives at the first input terminal thereof the second request signal, that receives at the second, inverting, input terminal thereof the first busy signal, and that outputs at the output terminal thereof a second access start signal; a fourth D flip-flop that receives at the clock input terminal thereof the RAM clock, that receives at the data input terminal thereof a predetermined logic signal, that receives at the set input terminal thereof the second access start signal, and that outputs at the output terminal thereof the second busy signal; and an OR circuit that receives at the first input terminal thereof the first access start signal, that receives at the second input terminal thereof the second access start signal, and that outputs at the output terminal thereof the clock request signal. (A third configuration.)

In the RAM control device having the third configuration described above, the predetermined logic signals fed to the data input terminals of the first and third D flip-flops may respectively be the inversions of the output signals of the first and third D flip-flops themselves. (A fourth configuration.)

In the RAM control device having the third or fourth configuration described above, the second D flip-flop may receive at the reset terminal thereof the second busy signal, or the fourth D flip-flop may receive at the reset terminal thereof the first busy signal. (A fifth configuration.)

In the RAM control device having the first configuration described above, based on whether or not the first and second access clocks are inputted and based on the logic level of the RAM clock, the arbiter circuit may judge whether or not, in a state in which an accidental turn has occurred in the busy signal corresponding to one of the first and second access clocks, the other of the first and second access clocks is rightfully inputted so that, on recognizing that state, the arbiter circuit turns the busy signal corresponding to the other access clock to a desired logic level according to the rightfully inputted access clock irrespective of the busy signal in which the accidental turn has occurred. (A sixth configuration.)

In the RAM control device having the sixth configuration described above, the arbiter circuit may be provided with: a first D flip-flop that receives at the clock input terminal thereof the first access clock, that receives at the data input terminal thereof a predetermined logic signal, that receives at the reset terminal thereof a first request reset signal, and that outputs at the output terminal thereof a first request signal; a first AND circuit that receives at the first input terminal thereof the first busy signal, that receives at the second, inverting, input terminal thereof the RAM clock, and that outputs at the output terminal thereof the first request reset signal; a second AND circuit that receives at the first input terminal thereof the first request signal, that receives at the second, inverting, input terminal thereof the second busy signal, and that outputs at the output terminal thereof a first pre signal; a second D flip-flop that receives at the clock input terminal thereof the RAM clock, that receives at the data input terminal thereof a predetermined logic signal, that receives at the set input terminal thereof the first access start signal, and that outputs at the output terminal thereof the first busy signal; a third D flip-flop that receives at the clock input terminal thereof the second access clock, that receives at the data input terminal thereof a predetermined logic signal, that receives at the reset terminal thereof a second request reset signal, and that outputs at the output terminal thereof a second request signal; a third AND circuit that receives at the first input terminal thereof the second busy signal, that receives at the second, inverting, input terminal thereof the RAM clock, and that outputs at the output terminal thereof the second request reset signal; a fourth AND circuit that receives at the first input terminal thereof the second request signal, that receives at the second, inverting, input terminal thereof the first busy signal, and that outputs at the output terminal thereof a second pre signal; a fourth D flip-flop that receives at the clock input terminal thereof the RAM clock, that receives at the data input terminal thereof a predetermined logic signal, that receives at the set input terminal thereof the second access start signal, and that outputs at the output terminal thereof the second busy signal; an OR circuit that receives at the first input terminal thereof the first access start signal, that receives at the second input terminal thereof the second access start signal, and that outputs at the output terminal thereof the clock request signal; a fifth AND circuit that receives at the first input terminal thereof the first request signal, that receives at the second, inverting, input terminal thereof the second request signal, that receives at the third input terminal thereof the RAM clock, and that outputs at the output terminal thereof a first through signal; a first OR circuit that receives at the first input terminal thereof the first pre signal, that receives at the second input terminal thereof the first through signal, and that outputs at the output terminal thereof the first access start signal; a sixth AND circuit that receives at the first, inverting, input terminal thereof the first request signal, that receives at the second input terminal thereof the second request signal, that receives at the third input terminal thereof the RAM clock, and that outputs at the output terminal thereof a second through signal; and a second OR circuit that receives at the first input terminal thereof the second pre signal, that receives at the second input terminal thereof the second through signal, and that outputs at the output terminal thereof the second access start signal. (A Seventh configuration.)

In the RAM control device having the seventh configuration described above, the predetermined logic signals fed to the data input terminals of the first and third D flip-flops may respectively be the inversions of the output signals of the first and third D flip-flops themselves. (An eighth configuration.)

In the RAM control device having the seventh or eighth configuration described above, the second D flip-flop may receive at the reset terminal thereof the second busy signal, or the fourth D flip-flop may receive at the reset terminal thereof the first busy signal. (A ninth configuration.)

The RAM control device having the first configuration described above may be further provided with: a clock division circuit that is provided in a stage preceding the arbiter circuit and that divides the first access clock, which is faster than the second access clock, into two divided access clocks by distributing successive pulses of the first access clock cycle-by-cycle alternately between the divided access clocks. Here, the arbiter circuit generates three busy signals according to a total of three access clocks, namely the two divided access clocks obtained from the first access clock and the second access clock. (A tenth configuration.)

In the RAM control device having the tenth configuration described above, the RAM clock may have a period such that the chain of sessions of arbitration between the two divided access clocks obtained from the first access clock ends within one period of the second access clock. (An eleventh configuration.)

In the RAM control device having the tenth or eleventh configuration described above, the arbiter circuit may be provided with: a first D flip-flop that receives at the clock input terminal thereof one of the two divided access clocks obtained from the first access clock, that receives at the data input terminal thereof a predetermined logic signal, that receives at the reset terminal thereof a first request reset signal, and that outputs at the output terminal thereof a first request signal; a first AND circuit that receives at the first input terminal thereof the first busy signal, that receives at the second, inverting, input terminal thereof the RAM clock, and that outputs at the output terminal thereof the first request reset signal; a second AND circuit that receives at the first input terminal thereof the first request signal, that receives at the second, inverting, input terminal thereof the second busy signal, that receives at the third, inverting, input terminal thereof a third busy signal, and that outputs at the output terminal thereof a first access start signal; a second D flip-flop that receives at the clock input terminal thereof the RAM clock, that receives at the data input terminal thereof a predetermined logic signal, that receives at the set input terminal thereof the first access start signal, and that outputs at the output terminal thereof the first busy signal; a third D flip-flop that receives at the clock input terminal thereof the other of the two divided access clocks obtained from the first access clock, that receives at the data input terminal thereof a predetermined logic signal, that receives at the reset terminal thereof a second request reset signal, and that outputs at the output terminal thereof a second request signal; a third AND circuit that receives at the first input terminal thereof the second busy signal, that receives at the second, inverting, input terminal thereof the RAM clock, and that outputs at the output terminal thereof the second request reset signal; a fourth AND circuit that receives at the first input terminal thereof the second request signal, that receives at the second, inverting, input terminal thereof the first busy signal, that receives at the third, inverting, input terminal thereof the third busy signal, and that outputs at the output terminal thereof a second access start signal; a fourth D flip-flop that receives at the clock input terminal thereof the RAM clock, that receives at the data input terminal thereof a predetermined logic signal, that receives at the set input terminal thereof the second access start signal, and that outputs at the output terminal thereof the second busy signal; a fifth D flip-flop that receives at the clock input terminal thereof the second access clock, that receives at the data input terminal thereof a predetermined logic signal, that receives at the reset terminal thereof a third request reset signal, and that outputs at the output terminal thereof a third request signal; a fifth AND circuit that receives at the first input terminal thereof the third busy signal, that receives at the second, inverting, input terminal thereof the RAM clock, and that outputs at the output terminal thereof the third request reset signal; a sixth AND circuit that receives at the first input terminal thereof the third request signal, that receives at the second, inverting, input terminal thereof the first busy signal, that receives at the third, inverting, input terminal thereof the second busy signal, and that outputs at the output terminal thereof a third access start signal; a sixth D flip-flop that receives at the clock input terminal thereof the RAM clock, that receives at the data input terminal thereof a predetermined logic signal, that receives at the set input terminal thereof the third access start signal, and that outputs at the output terminal thereof the third busy signal; and a first OR circuit that receives at the first input terminal thereof the first access start signal, that receives at the second input terminal thereof the second access start signal, that receives at the third input terminal thereof the third access start signal, and that outputs at the output terminal thereof the clock request signal. (A twelfth configuration.)

In the RAM control device having the twelfth configuration described above, the predetermined logic signals fed to the data input terminals of the first, third, and fifth D flip-flops may respectively be the inversions of the output signals of the first, third, and fifth D flip-flops themselves. (A thirteenth configuration.)

In the RAM control device having the twelfth or thirteenth configuration described above, the second and fourth D flip-flops may receive at the reset terminal thereof the third busy signal, or the sixth D flip-flop may receive at the reset terminal thereof the OR signal of the first and second busy signals. (A fourteenth configuration.)

In the RAM control device having any one of the tenth to fourteenth configurations described above, the arbiter circuit may incorporate the clock division circuit. (A fifteenth configuration.)

According to another aspect of the present invention, a memory device is provided with: the RAM control device having any one of the first to fifteenth configurations described above; and a RAM that operates in accordance with the RAM clock. (A sixteenth configuration.)

Advantages of the Invention

With a RAM control device according to the present invention, and with a memory device employing it, it is possible to control access to a RAM appropriately according to two asynchronously inputted access clocks without inviting undue increases in device scale and cost.

| List of Reference Symbols | |
|---|---|
| 1 | Arbiter Circuit |
| 2 | One-shot Circuit |
| 3 | RAM (Single-port RAM) |
| 4 | Output Latch Circuit |
| 5 | Read/write Circuit |
| 6a, 6b | (First, Second) Hosts |
| 7 | Clock Division Circuit |
| 8 | Arbiter Circuit |
| 11a, 11b | (First, Third) D Flip-flops |
| 12a, 12b | (First, Second) Inverters |
| 13a, 13b | (First, Third) AND Circuits |
| 14a, 14b | (Second, Fourth) AND Circuits |

-continued

List of Reference Symbols

| | |
|---|---|
| 15a, 15b | (Second, Fourth) D Flip-flops |
| 16 | OR Circuit |
| 17a, 17b | (Fifth, Sixth) AND Circuits |
| 18a, 18b | (First, Second) OR Circuits |
| 41 | D Flip-flop |
| 42 | Inverter |
| 43a, 43b | Selector |
| 44a, 44b | D Flip-flops |
| 71 | D Flip-flop |
| 72 | Inverter |
| 73a, 73b | AND Circuit |
| 81a, 81b, 81c | (First, Third, Fifth) D Flip-flops |
| 82a, 82b, 82c | (First, Second, Third) Inverters |
| 83a, 83b, 83c | (First, Third, Fifth) AND Circuits |
| 84a, 84b, 84c | (Second, Fourth, Sixth) AND Circuits |
| 85a, 85b, 85c | (Second, Fourth, Sixth) D Flip-flops |
| 86 | First OR Circuit |
| 87 | Second OR Circuit |

BEST MODE FOR CARRYING OUT THE INVENTION

Figure 1:
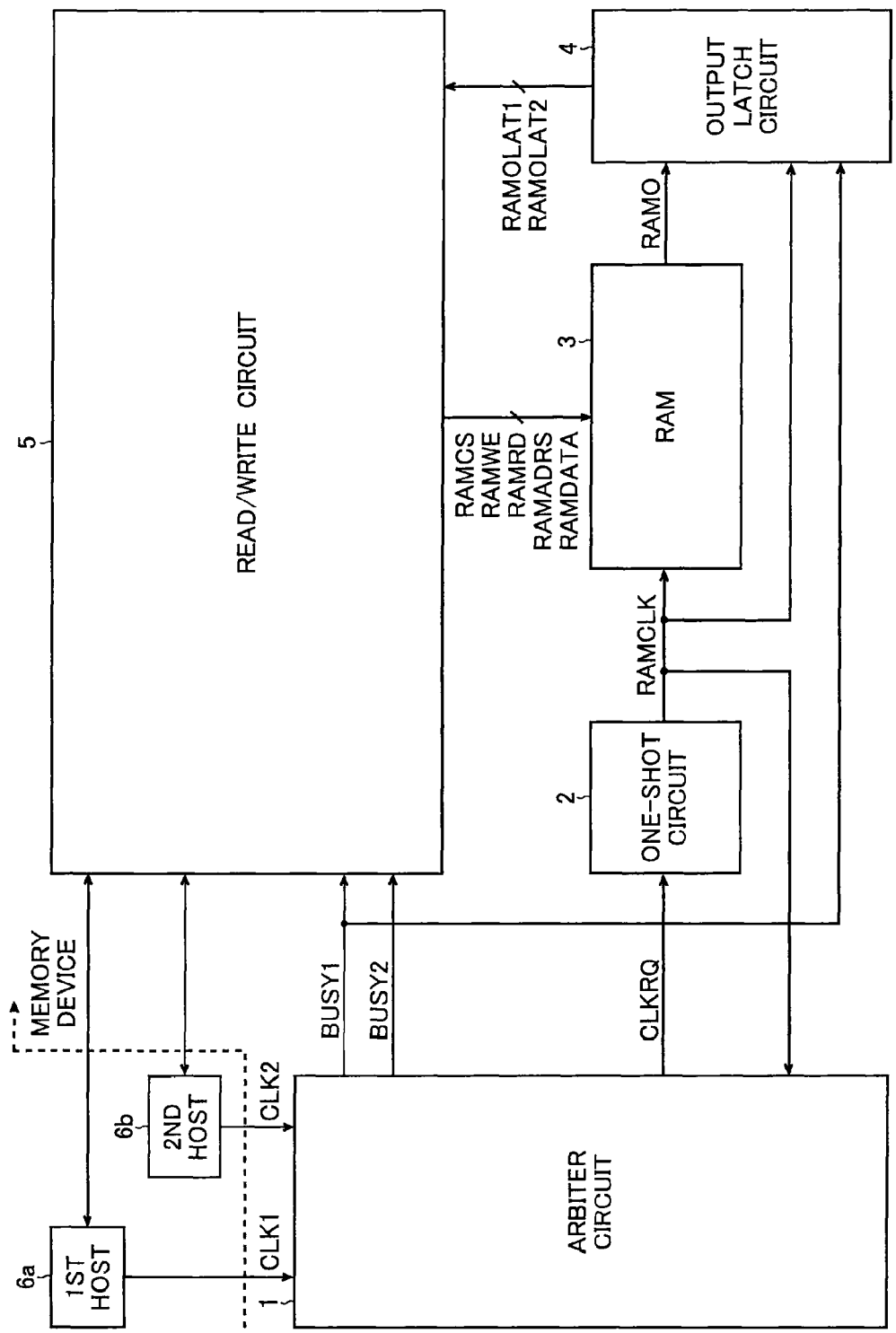
FIG. 1 A block diagram showing an example of a first configuration of a memory device according to the invention.

FIG. 1 is a block diagram showing an example of a first configuration of a memory device according to the invention.

As shown in FIG. 1, the memory device of this embodiment includes an arbiter circuit 1, a one-shot circuit 2, a RAM 3, an output latch circuit 4, and a read/write circuit 5. The memory device is so configured as to control access to the RAM 3 according to two access clocks, namely a first and a second access clock (CLK1 and CLK2) (e.g., for MPU access and display access), that are asynchronously inputted from hosts 6a and 6b (e.g., an MPU (microprocessing unit) and a display driver).

The arbiter circuit 1 serves as means (arbitrating/priority-deciding means) for, on one hand, generating a first and a second busy signal (BUSY1 and BUSY2) that are logically exclusive with each other according to CLK1 and CLK2 mentioned above in order to permit whichever of the hosts 6a and 6b outputs an access clock first to access the RAM 3 and, on the other hand, feeding a clock request signal (CLKRQ) to the one-shot circuit 2 to request it to generate a RAM clock (RAMCLK) for deciding the timing of access to the RAM 3.

The one-shot circuit 2 serves as means for generating one pulse as RAMCLK according to CLKRQ from the arbiter circuit 1 to feed it to the RAM 3. RAMCLK is fed not only to the RAM 3 but also to the arbiter circuit 1 and to the output latch circuit 4.

Adopted as the RAM 3 is a single-port RAM having only one input/output interface. Its use, compared with using a dual-port RAM, helps minimize increases in device scale and cost.

The output latch circuit 4 serves as means for latching RAM output signals (RAMO) in accordance with CLK1 and CLK2 respectively and then feeding them, as a first and a second RAM output latch signal (RAMOLAT1 and RAMOLAT2) to the read/write circuit 5.

The read/write circuit 5 serves as means for recognizing which of the hosts 6a and 6b is permitted the exclusive right to access the RAM 3 according to BUSY1 and BUSY2 from the arbiter circuit 1, and exchanging a chip select signal (RAMCS), a write enable signal (RAMWE), a read enable signal (RAMRD), an address signal (RAMADRS), and a data signal (RAMDATA) with the RAM 3.

RAMCS, RAMWE, and RAMRD mentioned above may instead be signals generated by the arbiter circuit 1 according to BUSY1 and BUSY 2.

Figure 2:
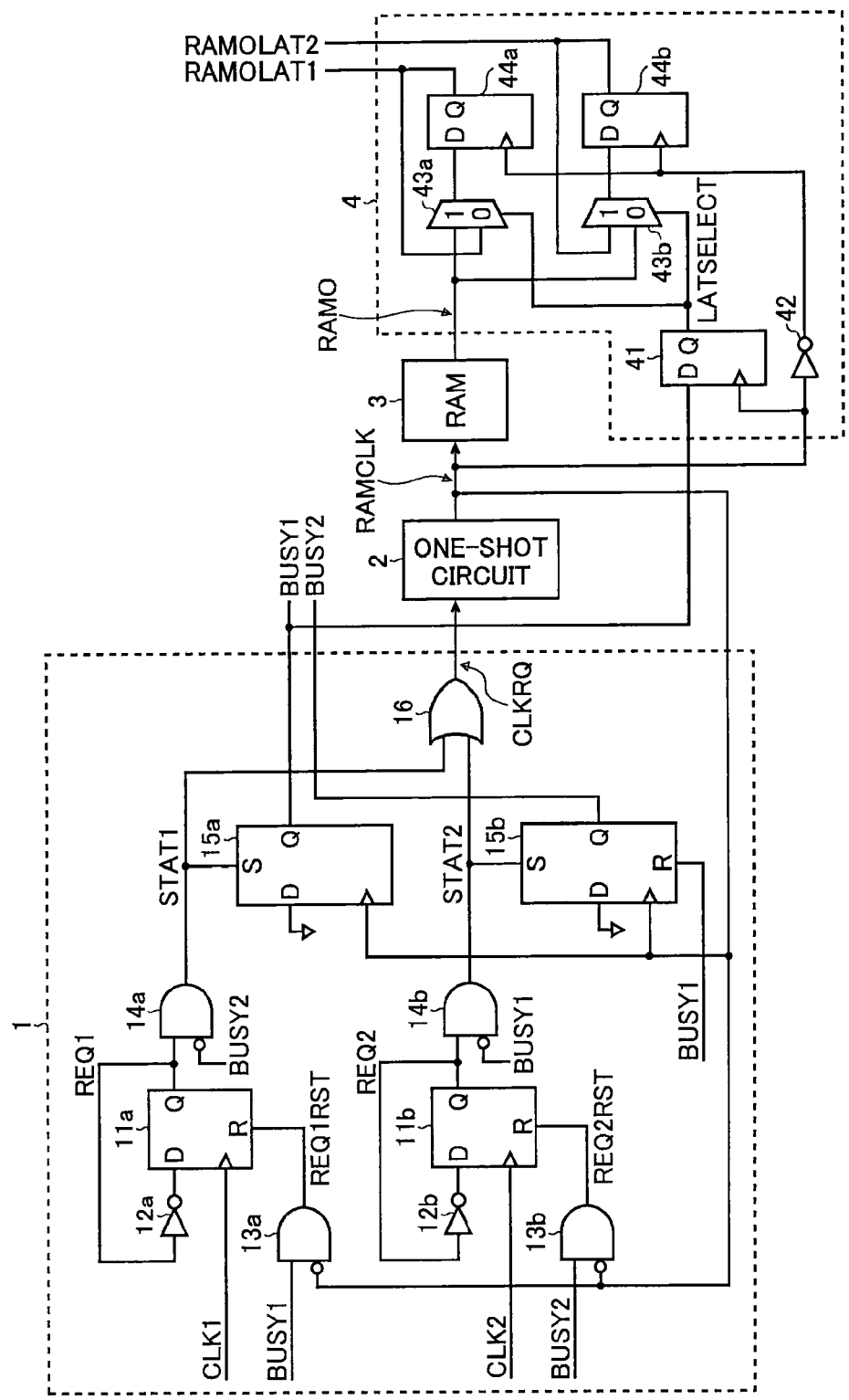
FIG. 2 A block diagram showing an example of the internal configuration of the arbiter circuit 1 and the output latch circuit 4.

Next, the internal configuration of the arbiter circuit 1 and the output latch circuit 4 will be described in detail with reference to FIG. 2. FIG. 2 is a block diagram showing an example of the internal configuration of the arbiter circuit 1 and the output latch circuit 4.

As shown in FIG. 2, the arbiter circuit 1 of this embodiment includes D flip-flops 11a and 11b, inverters 12a and 12b, AND circuits 13a and 13b, AND circuits 14a and 14b, D flip-flops 15a and 15b, and an OR circuit 16.

The first D flip-flop 11a receives CLK1 at its clock input terminal, receives a predetermined logic signal (its own output signal as inverted by the first inverter 12a) at its data input terminal, receives a first request reset signal (REQ1RST) at its reset terminal, and outputs a first request signal (REQ1) from its output terminal.

The first AND circuit 13a receives BUSY1 at its first input terminal, receives RAMCLK at its second—inverting—input terminal, and outputs REQ1RST at its output terminal.

The second AND circuit 14a receives REQ1 at its first input terminal, receives BUSY2 at its second—inverting—input terminal, and outputs a first access start signal (STAT1) at its output terminal.

The second D flip-flop 15a receives RAMCK at its clock input terminal, receives a predetermined logic signal (a reference voltage signal corresponding to low level, e.g., a ground voltage) at its data input terminal, receives STAT1 at its set input terminal, and outputs BUSY1 at its output terminal.

The third D flip-flop 11b receives CLK2 at its clock input terminal, receives a predetermined logic signal (its own output signal as inverted by the second inverter 12b) at its data input terminal, receives a second request reset signal (REQ2RST) at its reset terminal, and outputs a second request signal (REQ2) at its output terminal.

The third AND circuit 13b receives BUSY2 at its first input terminal, receives RAMCLK at its second—inverting—input terminal, and outputs REQ2RST at its output terminal.

The fourth AND circuit 14b receives REQ2 at its first input terminal, receives BUSY1 at its second—inverting—input terminal, and outputs a second access start signal (STAT2) at its output terminal.

The fourth D flip-flop 15b receives RAMCLK at its clock input terminal, receives a predetermined logic signal (a reference voltage signal corresponding to low level, e.g., a ground voltage) at its data input terminal, receives STAT2 at its set input terminal, and outputs BUSY2 at its output terminal. The fourth D flip-flop 15b further receives BUSY1 at its reset terminal.

The OR circuit 16 receives STAT1 at its first input terminal, receives STAT2 at its second input terminal, and outputs CLKRQ at its output terminal.

The first to fourth D flip-flops 11a, 15a, 11b, and 15b mentioned above are all triggered by the rising edges in the clock signals (CLK1, CLK2, and RAMCLK) they respectively receive.

On the other hand, the output latch circuit 4 of this embodiment includes a D flip-flop 41, an inverter 42, selectors 43a and 43b, and D flip-flops 44a and 44b.

The D flip-flop 41 receives RMCLK at its clock input terminal, receives BUSY1 at its data input terminal, and outputs a latch select signal (LATSELECT) at its output terminal.

The selector 43a, when LATSELECT is high (1), selects RAMO to feed it to the succeeding stage and, when LATSELECT is low (0), selects RAMOLAT1 to feed it to the succeeding stage.

The selector 43b, when LATSELECT is high (1), selects RAMOLAT2 to feed it to the succeeding stage and, when LATSELECT is low (0), selects RAMO to feed it to the succeeding stage.

The D flip-flop 44a receives, at its clock input terminal, RAMCLK as inverted by the inverter 42, and receives, at its data input terminal, the output signal of the selector 43a. The D flip-flop 44a outputs RAMOLAT1 at its output terminal.

The D flip-flop 44b receives, at its clock input terminal, RAMCLK as inverted by the inverter 42, and receives, at its data input terminal, the output signal of the selector 43b. The D flip-flop 44b outputs RAMOLAT2 at its output terminal.

The D flip-flops 41, 44a, and 44b mentioned above are all triggered by the falling edges in the clock signals (RAMCLK and inverted RAMCLK) they respectively receive.

Figure 3:
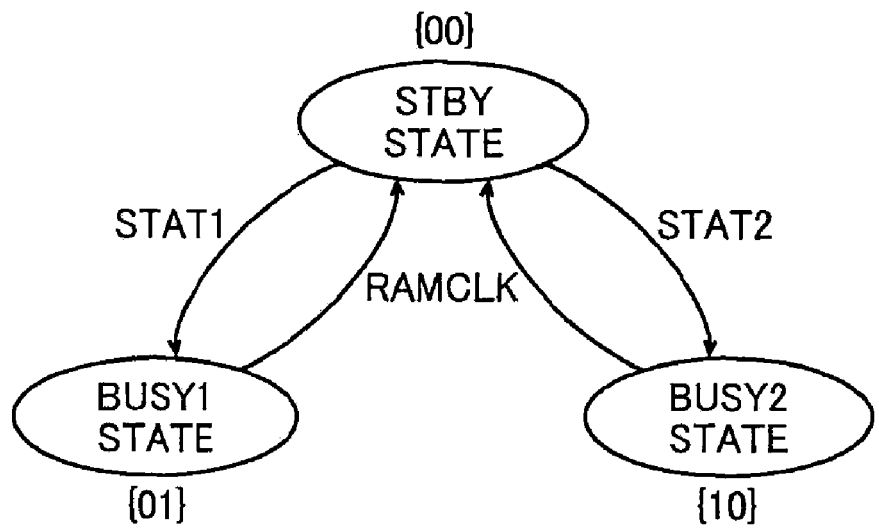
FIG. 3 A state diagram (a) and a logic value table (b) illustrating the operation state transition of the arbiter circuit 1.

Next, the operation state transition of the arbiter circuit 1 configured as described above will be described in detail with reference to FIG. 3. FIG. 3 is a state diagram (a) and a logic value table (b) illustrating the operation state transition of the arbiter circuit 1.

The arbiter circuit 1 configured as described above is designed to operate as what is generally known as an asynchronous finite state machine (AFSM), operating as shown in the state diagram and the logic value table of FIGS. 3(a) and (b).

Specifically, according to the logic levels of the first and second busy signals (BUSY1 and BUSY2) mentioned previously, the arbiter circuit 1 is in one of the following three operation states at a time: a stand-by state (STBY state), an access state according to CLK1 (BUSY1 state), and an access state according to CLK2 (BUSY2 state).

Here, the first busy signal (BUSY1) corresponds to the first digit of the state counter, and the second busy signal (BUSY2) corresponds to the second digit of the state counter. Thus, as shown in FIG. 3(b), the values of the state counter corresponding to the different operation states mentioned above are as follows: STBY state—{00}, BUSY1 state—{01}, and BUSY2 state—{10}. There is no state corresponding to {11} as will be described later.

As shown in FIG. 3(a), the operation state of the arbiter circuit 1 immediately after resetting is STBY state, and transitions to BUSY1 state when STAT1 rises; thereafter it returns to STBY state when RAMCLK rises. Likewise, the operation state transitions from STBY state to BUSY2 state when STAT2 rises, and thereafter returns to STBY state when RAMCLK rises.

In this way, the arbiter circuit 1 of this embodiment is so configured that, when its operation state transitions, only one bit (one digit) in the state counter changes; that is, it behaves as a gray code counter. Thus, with the arbiter circuit 1 of this embodiment, a transition of its operation state to one non-stand-by state takes place without passing through another non-stand-by state. This prevents erroneous state recognition at the moment of an operation state transition.

Figure 4:
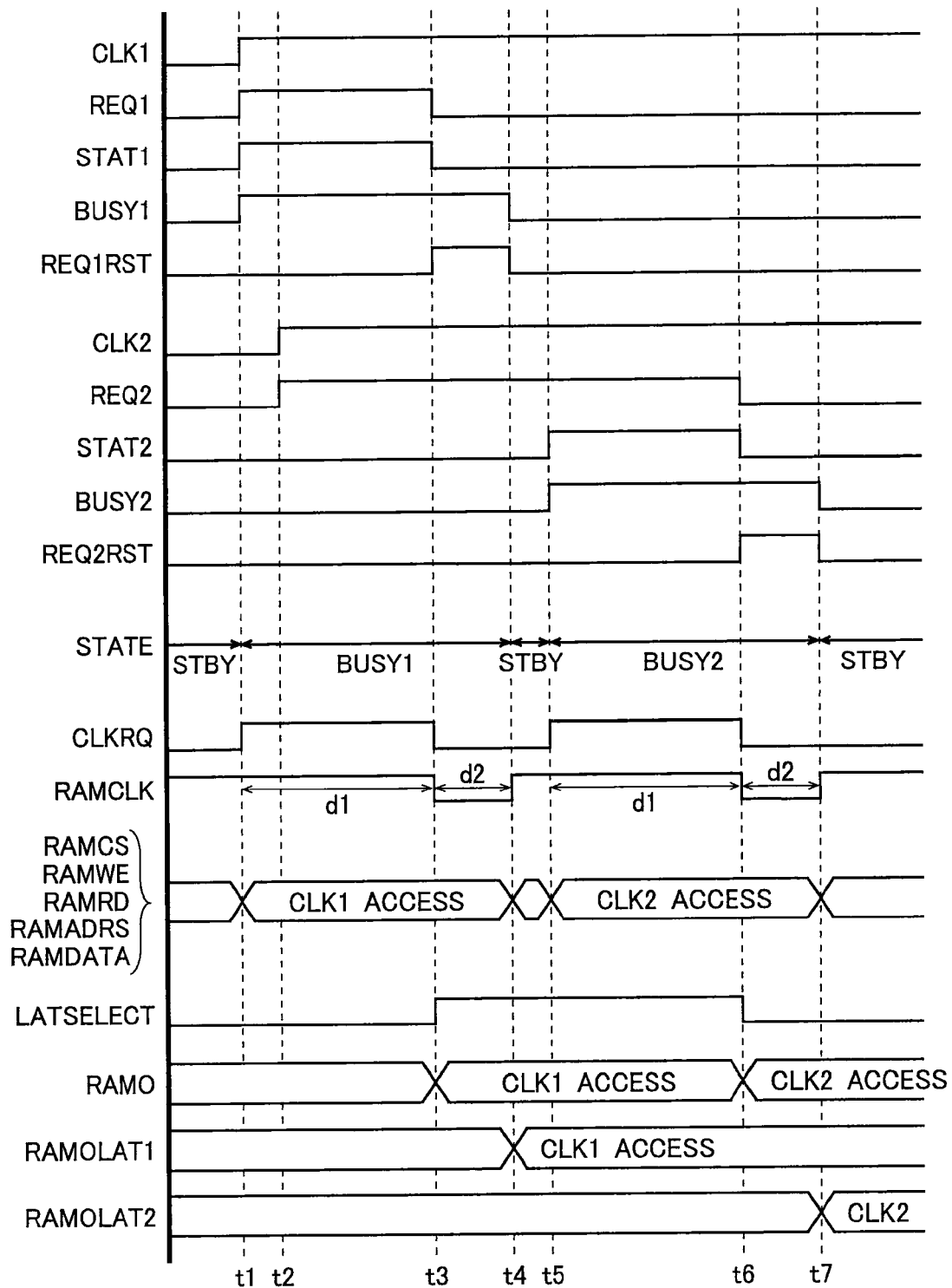
FIG. 4 A timing chart illustrating the RAM control operation.

Next, the operation (here a read operation will be taken up) of the RAM control device configured as described above will be described in detail with reference to FIG. 4. FIG. 4 is a timing chart illustrating the RAM control operation. The figure shows the waveforms of the relevant signals as observed in a case where first CLK1 is inputted (rises) and immediately thereafter CLK2 is inputted (rises).

As shown in FIG. 4, when, at time t1, CLK1 rises to high level, REQ1 turns from low level to high level. At this point, if the operation state of the arbiter circuit 1 is STBY state (with BUSY1 and BUSY2 both at low level), as shown in the figure, STAT1 turns from low level to high level. When STAT1 rises to high level, BUSY1 is set at high level, and thus the operation state of the arbiter circuit 1 transitions from STBY state, in which it has thus far been, to BUSY1 state. On recognizing this operation state transition, the read/write circuit 5 starts to access the RAM 3 (to perform chip selecting, address setting, and other operations) according to CLK1.

Moreover, when, in accordance with STAT1, CLKRQ rises to high level, the one-shot circuit 2 is started, causing it to generate RAMCLK. Here, the period d1 after the rise of STAT1 (i.e., the rise of CLK) until the one-shot pulse of RAMCLK actually falls to low level, and the period d2 for which RAMCLK thereafter remains at low level until it rises back to high level, are both determined by a delay circuit (unillustrated) provided in the one-shot circuit 2.

These periods d1 and d2, if set too long, may cause incomplete access and, if set too short, may cause defective access. Thus, the periods d1 and d2 need to be set appropriately to suit the maximum operating frequencies of CLK1 and CLK2 as will be described later.

On the other hand, when, at t2 immediately after the input of CLK1, CLK2 rises to high level, REQ2 turns from low level to high level. At this point, however, since BUSY1 is already at high level, REQ2 is masked by the fourth AND circuit 14b, leaving STAT2 kept at low level. Thus, BUSY2 does not turn to high level while BUSY1 is at high level, and accordingly access according to CLK2 is deferred until the operation state of the arbiter circuit 1 returns from BUSY1 state to STBY state, that is, until access according to CLK1 ends.

Thereafter, when, at time t3, the one-shot circuit 2 makes RAMCLK fall to low level, then, in the RAM 3, a read operation according to CLK1, that is, an operation for outputting RAMO, is started.

At this point, in the arbiter circuit 1, in accordance with the fall of RAMCLK, REQ1RST rises to high level, and REQ1 is reset from high level to low level. This causes STAT1 (and hence CLKRQ) to turn back to low level. BUSY1, on the other hand, continues to be kept at high level.

In the output latch circuit 4, in accordance with the fall of RAMCLK, LATSELECT is turned to high level (the same logic level as BUSY1). This causes the selector 43a to select RAMO to feed it to the D flip-flop 44a, and causes the selector 43b to select RAMOLAT2 to feed it to the D flip-flop 44b.

Thereafter, when, at time t4, RAMCLK rises back to high level, then, in the arbiter circuit 1, BUSY1 is reset to low level, and thus the operation state of the arbiter circuit 1 returns from BUSY state, in which it has thus far been, to STBY state. On recognition of this operation state transition, the read/write circuit 5 ends access to the RAM 3 according to CLK1. In the arbiter circuit 1, in accordance with the turn of the logic level of BUSY1, REQ1RST also is reset to low level.

Moreover, in the output latch circuit 4, in accordance with the rise of RAMCLK (i.e., the fall of inverted RAMCLK), RAMO as read out at time t4 is latched as RAMOLAT1. Thus, thereafter the read/write circuit 5 can read out RAMOLAT1 (read data according to CLK1) from the output latch circuit 4 at any timing.

When, at time t4, access according to CLK1, which was inputted first, ends and BUSY1 is reset to low level, then, at time t5, the fourth AND circuit 14b stops masking REQ2, and thus STAT2 turns from low level to high level. Thus, after time t5, access according to CLK2 is performed through operations similar to those described above.

It should be noted that, in FIG. 4, the length of the period between times t4 and t5, which is extremely short in reality, is exaggerated to make it clear that the transition from BUSY1 state to BUSY2 state takes place not directly but by passing through STBY state.

It should also be noted that, although FIG. 4 shows, as an example, a case in which first CLK1 is inputted and then CLK2 is inputted, also in a case where they are inputted in the reverse order, through operations similar to those described above, access according to CLK1 is deferred until access according to CLK2 ends.

In this way, the arbiter circuit 1 of this embodiment is so configured that whichever access clock is inputted first is given priority, and not that a given access clock is always given priority. Thus, even if, during prior access, posterior access is requested, the prior access is not interrupted, but the posterior access is deferred until the prior access ends. This eliminates the need to provide restrictions according to access timing.

As described above, the RAM control device of this embodiment includes an arbiter circuit 1 and a one-shot circuit 2, and controls access to a RAM 3 according to two asynchronously inputted access clocks CLK1 and CLK2. The arbiter circuit 1 serves as means for, on one hand, generating busy signals BUSY1 and BUSY2 that are logically exclusive with each other according to CLK1 and CLK2 mentioned above in order to permit whichever host outputs an access clock first to access the RAM 3 and, on the other hand, requesting the one-shot circuit 2 to generate a RAM clock RAMCLK for deciding the timing of access to the RAM 3. The one-shot circuit 2 serves as means for generating one pulse as RAMCLK according to CLKRQ from the arbiter circuit 1 to feed it to the RAM 3.

With this configuration, it is possible to control access to the RAM 3 according to the two asynchronously inputted access clocks CLK1 and CLK2 appropriately, while minimizing increases in device scale and cost.

Moreover, in the RAM control device of this embodiment, for the two access clocks CLK1 and CLK2, the one-shot circuit 2 generates only one RAM clock RAMCLK. Thus, unlike a configuration in which RAM clocks RAMCLK are generated one for each of the access clocks CLK1 and CLK2 and arbitration and selection between them are needed to output one of them at a time, there is no need to consider the deviation in timing among a plurality of clocks.

Moreover, the RAM control device of this embodiment is so configured that requests for access are recognized in accordance with rises of CLK1 and CLK2 and there is no need for falls of these clocks. That is, the RAM control device of this embodiment operates in response only to rising edges in CLK1 and CLK2. Rising edges in CLK1 and CLK2 are generated only when there are requests for access to RAM 3 from the hosts 6a and 6b. This makes it possible to competently cope with, for example, even a case where the operating frequency of one is extremely low or high relative to that of the other.

Moreover, as shown in FIG. 2, in the arbiter circuit 1 of this embodiment, BUSY1 is fed to the reset terminal of the fourth D flip-flop 15b. With this configuration, even if CLK1 and CLK2 rise simultaneously and the second and fourth AND circuits 14a and 14b cannot mask one of them in time, with the result that STAT1 and STAT2 both turn to high level and BUSY1 and BUSY2 are both set at high level, the fourth D flip-flop 15b is immediately reset by BUSY1, and thus BUSY2 is turned back to low level without delay. Thus, BUSY1 and BUSY2 are not both kept at high level, and the operation state of the arbiter circuit 1 is made to transition preferentially to BUSY1 state. Thus, even if the input of CLK1 and CLK2 occurs exactly simultaneously, normal operation is ensured without any measure taken against spike noise in the analog section.

Incidentally, on the occasion of simultaneous input of CLK1 and CLK2, either of them may be given priority. Specifically, CLK1 may be given priority as described above, or instead CLK2 may be given priority by feeding BUSY2 to the reset terminal of the second D flip-flop 15a.

Moreover, as shown in FIG. 2, the arbiter circuit 1 of this embodiment is so configured that the first and third D flip-flops 11a and 11b respectively receive, at their data input terminals, the inversions of their own output signals (i.e., inverted REQ1 and inverter REQ2). With this configuration, even if, after STAT1 (STAT2) turns to high level, RAMCLK fails to rise under the influence of noise or the like, at the next rising edge of CLK1 (CLK2), a low level (inverted REQ1 (inverted REQ2)) is written to REQ1 (REQ2), and thus the operation state of the arbiter circuit 1 returns from BUSY1 (BUSY2) state to STBY state. Thus, it is possible to prevent the RAM control device from entering a state (what is generally called a deadlock or hung-up state) in which it cannot get out of BUSY1 (BUSY2) state.

In a case where the above measure against a deadlock is unnecessary, the first and third D flip-flops 11a and 11b simply need to receive, at their data input terminals, a signal having a predetermined level (a voltage signal corresponding to high level, e.g., the supply voltage).

One shortcoming with the arbiter circuit 1 configured as described above is that, under the influence of noise or the like, the logic level of one of BUSY1 and BUSY2 may so turn as to produce a state (an illegal state) that does not occur in the ordinary flow, causing the arbiter circuit 1 to enter into a state (what is generally called a deadlock or hung-up state) in which, even a request for access arises from the other side, it is not reflected.

More specifically, if the logic level of BUSY1 generated by the second D flip-flop 15a accidentally turns to high level under the influence of noise or the like, since CLK1 is not inputted, REQ1 is kept at low level, and thus the one-shot circuit 2 does not generate RAMLCK. In this state, if CLK2 is thereafter inputted, REQ2 is gated by BUSY1, which has been accidentally kept at high level, and thus the turn of REQ2 to high level is not transferred. This prevents STAT2 from rising. As a result, access according to CLK2 remains impossible for a while, until the next access according to CLK1 ends and a return is made from accidental BUSY1 state to STBY state. On the other hand, if the logic level of BUSY2 generated by the fourth D flip-flop 15b accidentally turns to high level under the influence of noise or the like, access according to CLK1 remains impossible for a while.

In view of the foregoing, it is preferable that the internal configuration of the arbiter circuit 1 be so modified that, when a rightful request for access arises in an illegal state, the corresponding request signal can manage to pass through the exclusive gating by an accidental busy signal from the other side.

Figure 5:
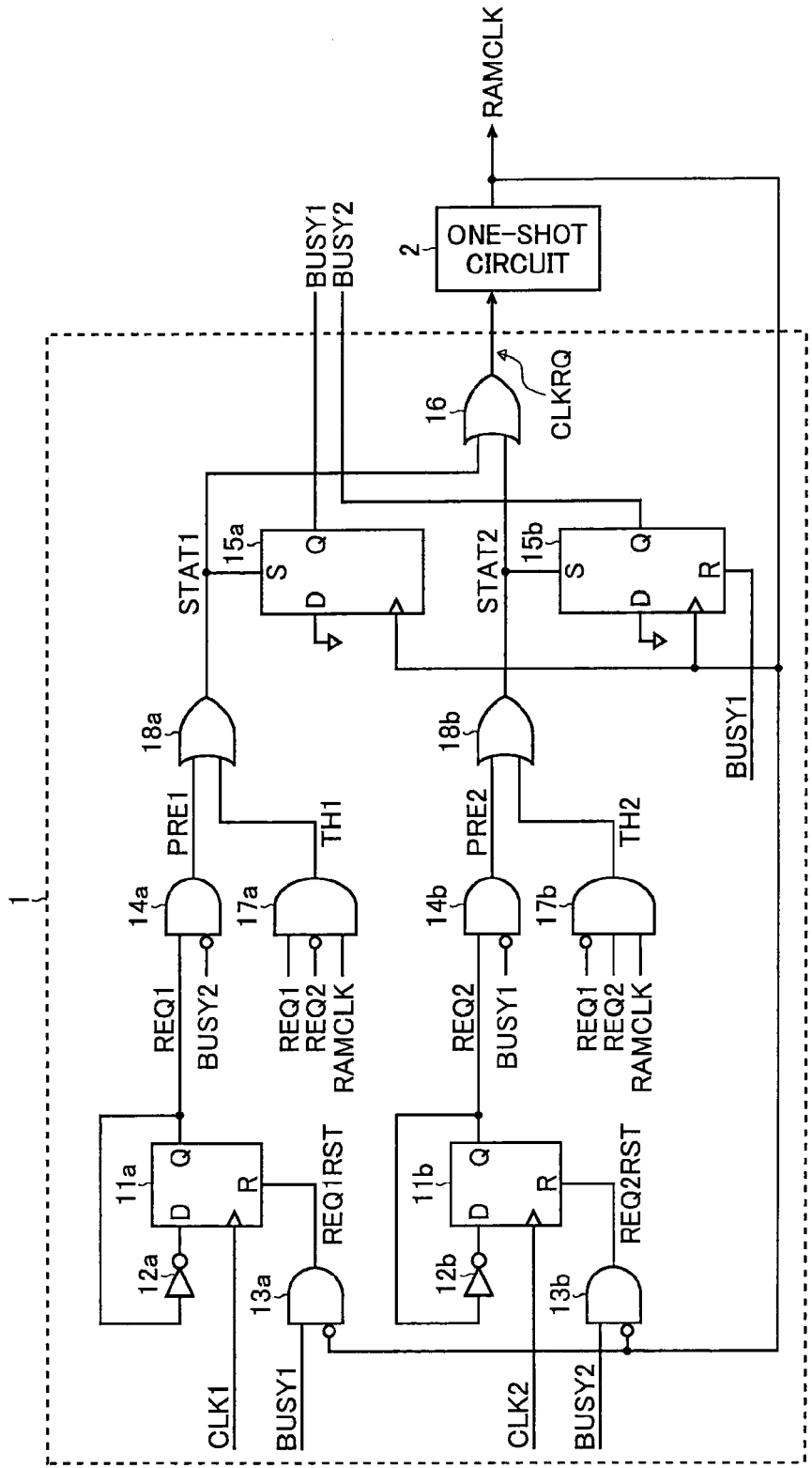
FIG. 5 A block diagram showing another example of the internal configuration of the arbiter circuit 1.

FIG. 5 is a block diagram showing another example of the internal configuration of the arbiter circuit 1.

The configuration of this example of the arbiter circuit 1 is largely the same as the previously described configuration. Accordingly, such components here as find their counterparts in FIG. 2 are identified by the same reference numerals and symbols as those used there, and their detailed explanations will not be repeated. The following description thus proceeds with emphasis placed on the features (a measure against a deadlock) unique to this example.

As shown in FIG. 5, the arbiter circuit 1 of this example includes, in addition to the components shown in FIG. 2, AND circuits 17a and 17b and OR circuits 18a and 18b.

In the arbiter circuit 1 of this example, the output signal of the second AND circuit 14a is used not directly as STAT1 but as a first pre signal (PRE1). Likewise, the output signal of the fourth AND circuit 14b is used not directly as STAT2 but as a second pre signal (PRE2).

The fifth AND circuit 17a receives REQ1 at its first input terminal, receives REQ2 at its second—inverting—input terminal, receives RAMCLK at its third input terminal, and outputs a first through signal (TH1) at its output terminal.

The first OR circuit 18a receives PRE1 at its first input terminal, receives TH1 at its second input terminal, and outputs STAT1 at its output terminal.

The sixth AND circuit 17b receives REQ1 at its first—inverting—input terminal, receives REQ2 at its second input terminal, receives RAMCLK at its third input terminal, and outputs a second through signal (TH2) at its output terminal.

The second OR circuit 18b receives PRE2 at its first input terminal, receives TH2 at its second input terminal, and outputs STAT2 at its output terminal.

In the arbiter circuit 1 configured as described above, for example, if the logic level of BUSY1 generated by the second D flip-flop 15a accidentally turns to high level under the influence of noise or the like and in addition, in that state, CLK2 is inputted, then, as described previously, REQ2 is gated by BUSY1, which has been accidentally kept at high level, and thus the turn of REQ2 to high level is not transferred to PRE2. This prevents STAT2 from rising. Thus, in a case where CLK2 is inputted after an accidental turn of the logic level of BUSY1, REQ1 remains at low level and REQ2 turns to high level, but PRE2 remains low level and thus RAMCLK remains at high level initially.

On the other hand, when REQ1, REQ2, and RAMCLK with the just mentioned logic levels are fed to the sixth AND circuit 17b, the logic level of TH2 turns from low level to high level. Accordingly, irrespective of the logic level of PRE2, the second OR circuit 18b makes STAT2 rise to high level, and thus RAMCLK is generated according to CLK2. Incidentally, if any of REQ1, REQ2, and RAMCLK has a logic level different from those mentioned above, the logic level of TH2 is at low level, and thus PRE2 is outputted as STAT2.

In this way, in the arbiter circuit 1 of this example, when rightful CLK2 is inputted in a state in which an accidental turn has occurred in the logic level of BUSY1, REQ2 manages to pass through the exclusive gating by BUSY1 (more precisely, although REQ2 does not really go through the ordinary flow, it behaves as if it passed through the exclusive gating by BUSY1).

As described above, the arbiter circuit 1 of this example judges, based on the logic levels of REQ1 and REQ2 (i.e., whether or not CLK1 and CLK2 are inputted) and the logic level of RAMCLK, whether or not rightful CLK2 is inputted in a state in which an accidental turn has occurred in the logic level of BUSY1; if so, irrespective of BUSY1, whose logic level has been accidentally turned, BUSY2 is turned to the desired logic level according to rightful CLK2. Thus, with the arbiter circuit 1 of this example, access according to CLK2 can be performed without waiting for the input of CLK1, and then a return to STBY state can be made without delay.

On the other hand, if CLK1 is inputted in a state in which BUSY2 has been accidentally turned to high level, REQ1 is at high level, REQ2 is at low level, and RAMCLK is at high level, and thus the fifth AND circuit 17a turns the logic level of TH1 to high level. Accordingly, irrespective of the logic level of PRE1, the first OR circuit 18a makes STAT1 rise to high level, and thus RAMCLK is generated according to CLK1. Thus, with the arbiter circuit 1 of this example, access according to CLK1 can be performed without waiting for the input of CLK2, and then a return to STBY state can be made without delay.

Figure 6:
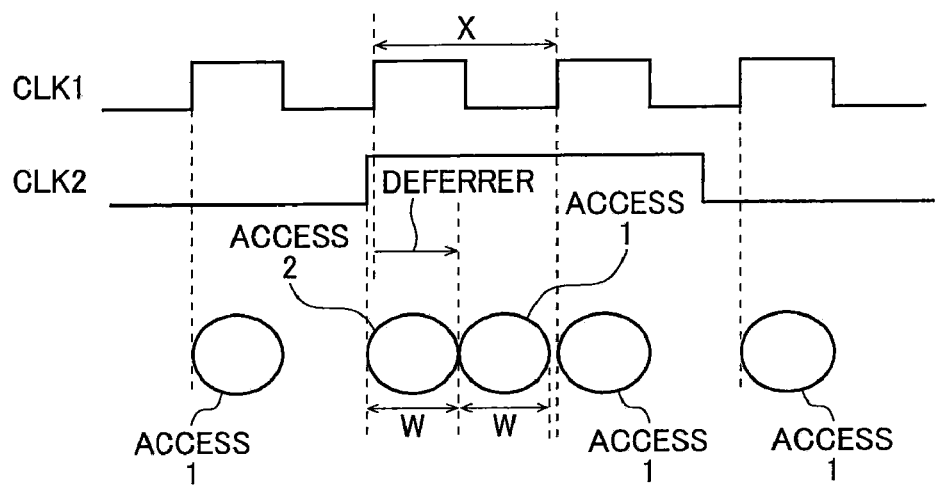
FIG. 6 A diagram illustrating the temporal restriction on RAM access in accordance with the maximum operating frequency of the access clocks.

Next, the temporal restriction on RAM access (restriction on the period of RAMCLK) in accordance with the maximum operation frequency of the access clocks will be described in detail with reference to FIG. 6. FIG. 6 is a diagram illustrating the temporal restriction on RAM access in accordance with the maximum operating frequency of the access clocks.

The RAM 3 is accessed most frequently when, as shown in FIG. 6, access according to CLK2 is requested while successive access according to CLK1 is being continued (and vice versa). FIG. 6 shows the worst case in which CLK2 rises immediately before CLK1 rises.

As described previously, the arbiter circuit 1 can defer access according to CLK1 until access according to CLK2 ends, and can also defer access according to CLK2 until access according to CLK1 ends. When successive access according to CLK1 is being performed, however, unless access according to CLK2 ends within one cycle of CLK1, posterior access according to CLK1 cannot be deferred until prior access according to CLK1 ends. This causes incomplete access.

To avoid this, and thereby to keep the RAM control device operating normally, within the length of time corresponding to one cycle of CLK1, two sessions of RAM access (according to CLK1 and CLK2 respectively) need to be completed. To achieve this, in the one-shot circuit 2, the period d1 after CLKRQ rises until the one-shot pulse of RAMCLK falls to low level, and the period d2 for which RAMCLK thereafter remains at low level until it rises back to high level (for the periods d1 and d2, see FIG. 4), need to be set appropriately to suit the maximum operating frequency (i.e., the shortest period) of whichever access clock is faster (in the case shown in FIG. 6, CLK1). More specifically, the periods d1 and d2 need to be so set that their sum (i.e., the RAM access period W) is longer than or equal to the minimum period Z at or above which defective access to RAM 3 does not occur but shorter than or equal to one-half of the shortest period X of CLK1.

Here, the maximum operation frequency of access clocks is expected to become higher and higher in the future, making it more and more difficult to manage and set the above-mentioned periods d1 and d2 to fulfill the above-mentioned condition.

In view of the foregoing, it is preferable that the circuit configuration of the memory device be so modified as to alleviate the above-described condition as much as possible.

Figure 7:
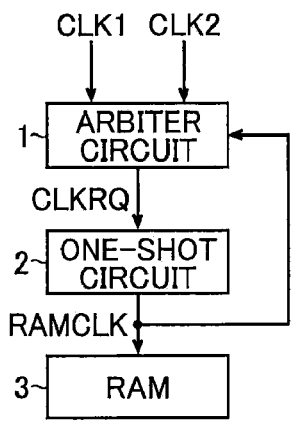
FIG. 7 A block diagram showing an example of a second configuration of a memory device according to the invention.
Figure 7:
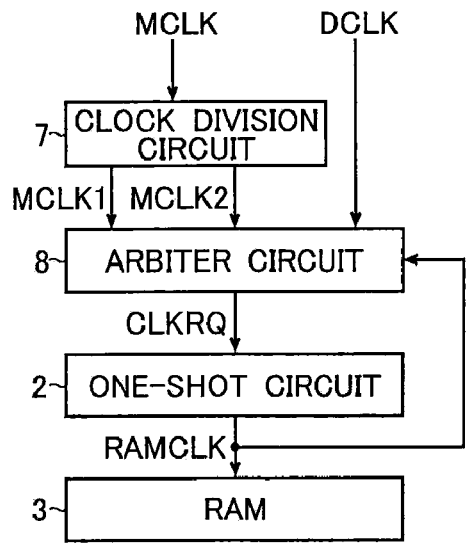

FIG. 7 is a block diagram showing an example of a second configuration of a memory device according to the invention.

As shown in FIG. 7(a), in the first configuration described previously, two access clocks (CLK1 and CLK2) are both fed directly to the arbiter circuit 1, where arbitration between those access clocks is performed to convert them into a single clock request signal (CLKRQ), according to which the one-shot circuit 2 generates a RAM clock (RAMCLK).

By contrast, in the second configuration, assuming that the first and second access clocks are, for example, an MPU access clock (MCLK) and a display access clock (DCLK) and that MCLK has a higher operating frequency than DCLK, as shown in FIG. 7(b), by use of a clock division circuit 7, MCLK in the form of a single clock is divided into two clocks, namely a first and a second divided access clocks (MCLK1 and MCLK2), by distributing the successive pulses of the former cycle-by-cycle alternately between the latter; these divided access clocks along with DCLK—hence three access clocks (MCLK1, MCLK2, and DCLK) in total—are then fed to an arbiter circuit 8, where arbitration among those access clocks is performed to convert them into a single clock request signal (CLKRQ), according to which the one-shot circuit 2 generates a RAM clock (RAMCLK).

Figure 8:
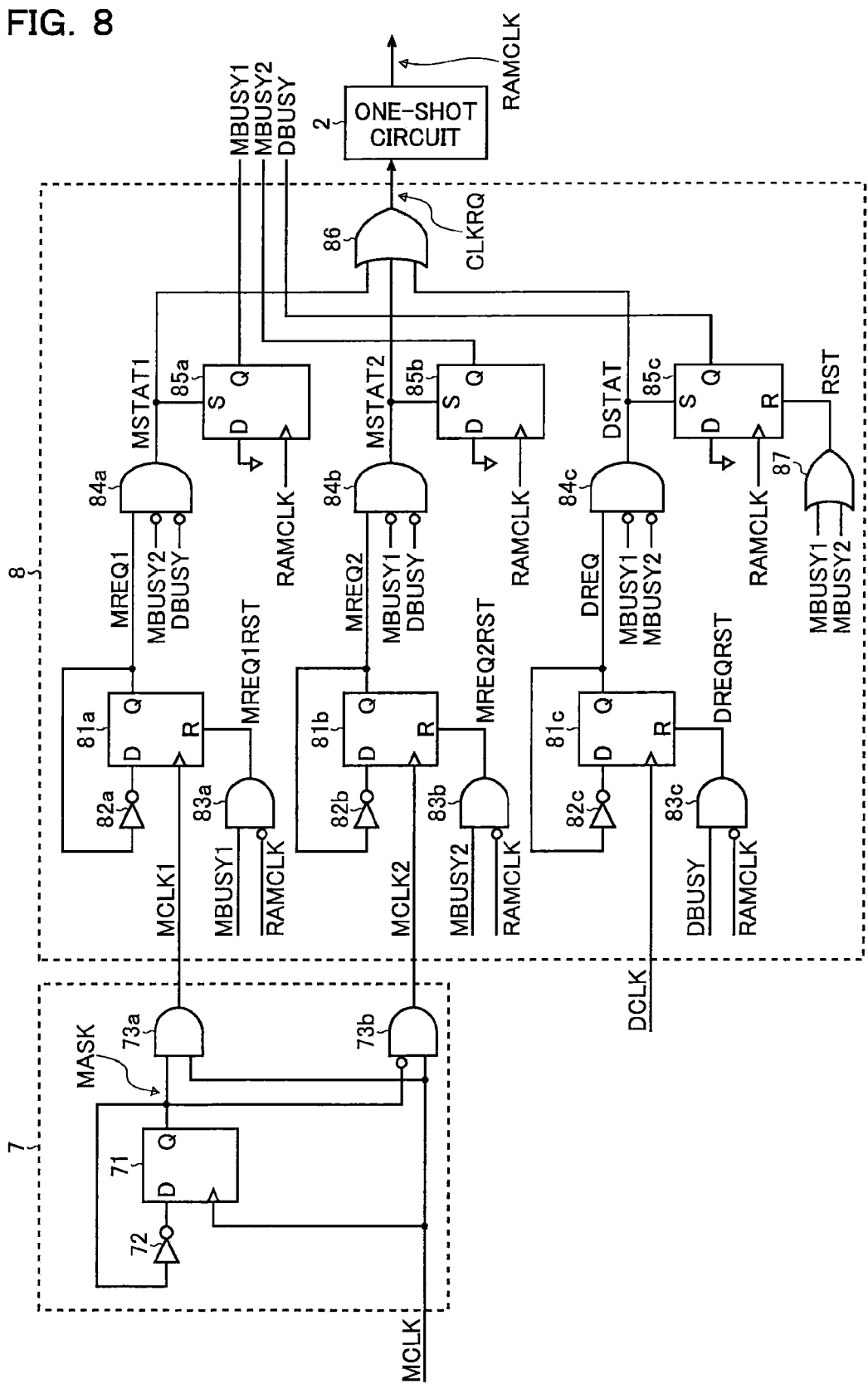
FIG. 8 A block diagram showing an example of the internal configuration of the clock division circuit 7 and the arbiter circuit 8.

Next, the internal configuration of the clock division circuit 7 and the arbiter circuit 8 will be described in detail with reference to FIG. 8. FIG. 8 is a block diagram showing an example of the internal configuration of the clock division circuit 7 and the arbiter circuit 8.

As shown in FIG. 8, the clock division circuit 7 of this configuration includes a D flip-flop 71, an inverter 72, and AND circuits 73*a* and 73*b*.

The D flip-flop 71 receives MCLK at its clock input terminal, receives a predetermined logic signal (its own output signal as inverted by the inverter 72), and outputs a mask signal (MASK) at its output terminal.

The AND circuit 73*a* receives MASK at its first input terminal, receives MCLK at its second input terminal, and outputs MCLK1 at its output terminal.

The AND circuit 73*b* receives MASK at its first—inverting—input terminal, receives MCLK at its second input terminal, and outputs MCLK2 at its output terminal.

Figure 10:
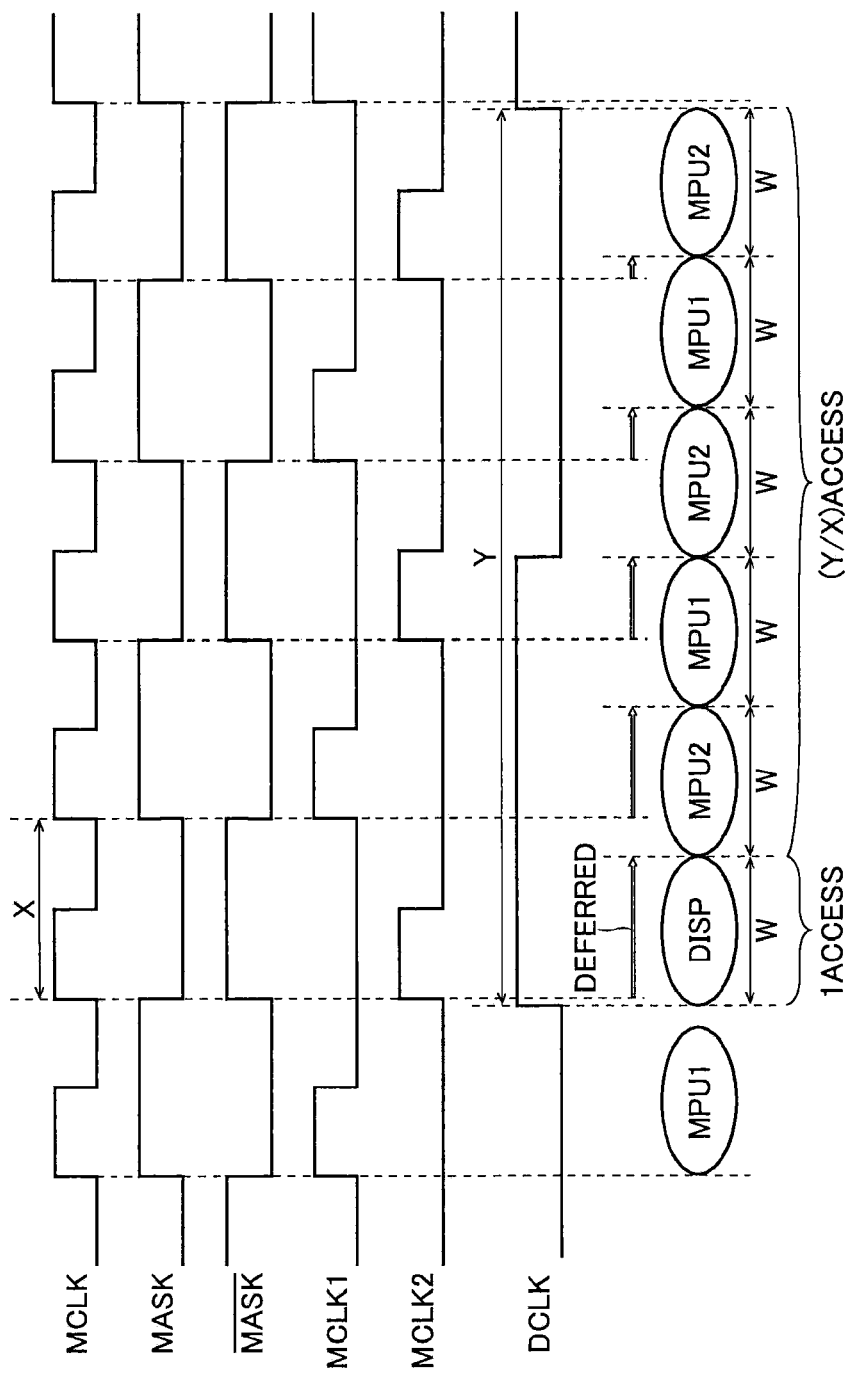
FIG. 10 A diagram illustrating the temporal restriction on RAM access in accordance with the maximum operating frequency of the access clocks in the second configuration.

In the clock division circuit 7 configured as described above, the AND of MASK and MCLK and the AND of inverted MASK and MCLK are calculated to thereby produce MCLK1 and MCLK2 between which the successive pulses of MCLK is distributed cycle-by-cycle alternately as shown in FIG. 10, which will be described in detail later.

On the other hand, the arbiter circuit 8 of this configuration includes D flip-flops 81*a* to 81*c*, inverters 82*a* to 82*c*, AND circuits 83*a* to 83*c*, AND circuits 84*a* to 84*c*, D flip-flops 85*a* to 85*c*, and OR circuits 86 and 87.

The first D flip-flop 81*a* receives MCLK1 at its clock input terminal, receives a predetermined logic signal (its own output signal as inverted by the first inverter 82*a*) at its data input terminal, receives a first MPU request reset signal (MREQ1RST) at its reset terminal, and outputs a first MPU request signal (MREQ1).

The first AND circuit 83*a* receives a first MPU busy signal (MBUSY1) at its first input terminal, receives RAMCLK at its second—inverting—input terminal, and outputs MREQ1RST at its output terminal.

The second AND circuit 84*a* receives MREQ1 at its first input terminal, receives a second MPU busy signal (MBUSY2) at its second—inverting—input signal, receives a display busy signal (DBUSY) at its third—inverting—input signal, and outputs a first MPU access start signal (MSTAT1) at its output terminal.

The second D flip-flop 85*a* receives RAMCLK at its clock input terminal, receives a predetermined logic signal (a reference voltage signal corresponding to low level, e.g., a ground voltage) at its data input terminal, receives MSTAT1 at its set input terminal, and outputs MBUSY1 at its output terminal.

The third D flip-flop 81*b* receives MCLK2 at its clock input terminal, a predetermined logic signal (its own output signal as inverted by the second inverter 82*b*) at its data input terminal, receives a second MPU request reset signal (MREQ2RST) at its reset terminal, and outputs a second MPU request signal (MREQ2) at its output terminal.

The third AND circuit 83*b* receives MBUSY2 at its first input terminal, receives RAMCLK at its second—inverting—input terminal, and outputs MREQ2RST at its output terminal.

The fourth AND circuit 84*b* receives MREQ2 at its first input terminal, receives MBUSY1 at its second—inverting—input terminal, receives DBUSY at its third—inverting—input signal, and outputs a second MPU access start signal (MSTAT2) at its output terminal.

The fourth D flip-flop 85*b* receives RAMCLK at its clock input terminal, receives a predetermined logic signal (a reference voltage signal corresponding to low level, e.g., a ground voltage) at its data input terminal, receives MSTAT2 at its set input terminal, and outputs MBUSY2 at its output terminal.

The fifth D flip-flop 81*c* receives DCLK at its clock input terminal, receives a predetermined logic signal (its own output signal as inverted by the third inverter 82*c*) at its data input terminal, receives DREQRST at its reset terminal, and outputs a display request signal (DREQ) at its output terminal.

The fifth AND circuit 83*c* receives DBUSY at its first input terminal, receives RAMCLK at its second—inverting—input terminal, and outputs DREQRST at its output terminal.

The sixth AND circuit 84*c* receives DREQ at its first input terminal, receives MBUSY1 at its second—inverting—input terminal, receives MBUSY2 at its third—inverting—input signal, and outputs a display access start signal (DSTAT) at its output terminal.

The sixth D flip-flop 85*c* receives RAMCLK at its clock input terminal, receives a predetermined logic signal (a reference voltage signal corresponding to low level, e.g., a ground voltage) at its data input terminal, receives DSTAT at its set input terminal, and outputs DBUSY at its output terminal. The sixth D flip-flop 85*c* further receives a reset signal (RST) at its reset terminal.

The first OR circuit 86 receives MSTAT1 at its first input terminal, receives MSTAT2 at its second input terminal, receives DSTAT at its third input terminal, and outputs CLKRQ at its output terminal.

The second OR circuit 87 receives MBUSY1 at its first input terminal, receives MBUSY2 at its second input terminal, and outputs RST at its output terminal.

The first to sixth D flip-flops 81*a*, 85*a*, 81*b*, 85*b*, 81*c*, and 85*c* mentioned above are all triggered by the rising edges in the clock signals (MCLK1, MCLK2, DCLK, and RAMCLK) they respectively receive.

As will be understood from the foregoing, the arbiter circuit 8 of this configuration is a modification of the two-input arbiter circuit 1 shown in FIG. 2 to a three-input one, and operates basically as described previously. Accordingly, no detailed description in this regard will be given separately.

Incidentally, on the occasion of simultaneous input of MCLK and DCLK, either of them may be given priority. Specifically, MCLK may be given priority by feeding the OR of MBUSY1 and MBUSY2 to the reset terminal of the sixth D flip-flop 85*c* as shown in FIG. 8, or instead DCLK may be given priority by feeding DBUSY to the reset terminal of the second and fourth D flip-flops 85*a* and 85*b*.

Figure 9:
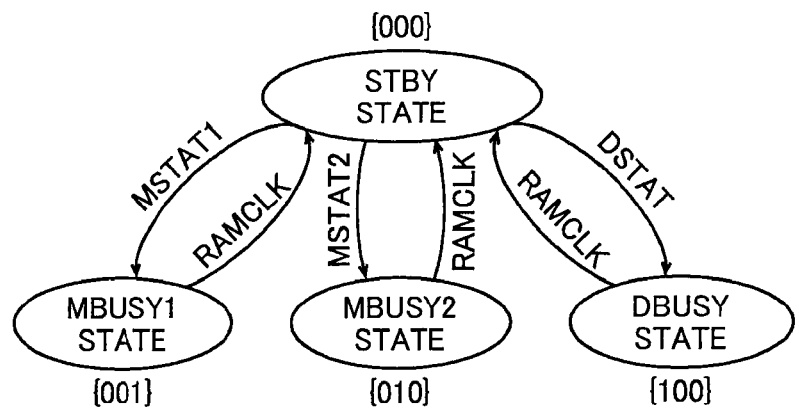
FIG. 9 A state diagram (a) and a logic value table (b) illustrating the operation state transition of the arbiter circuit 8.

Next, the operation state transition of the arbiter circuit 8 configured as described above will be described in detail with reference to FIG. 9. FIG. 9 is a state diagram (a) and a logic value table (b) illustrating the operation state transition of the arbiter circuit 8.

The arbiter circuit 8 configured as described above, like that of the first configuration described previously, is designed to operate as what is generally known as an asynchronous finite state machine, operating as shown in the state diagram and the logic value table of FIGS. 9(*a*) and (*b*).

Specifically, according to the logic levels of the three busy signals (MBUSY1, MBUSY2, and DBUSY) mentioned previously, the arbiter circuit 8 is in one of the following four operation states at a time: a stand-by state (STBY state), an access state according to MCLK1 (MBUSY1 state), an access state according to MCLK2 (MBUSY2 state), and an access state according to DCLK (DBUSY state).

Here, the first and second MPU busy signals (MBUSY1 and MBUSY2) correspond to the first and second digits of the state counter, and the display busy signal (DBUSY) corresponds to the third digit of the state counter. Thus, as shown in FIG. 9(b), the values of the state counter corresponding to the different operation states mentioned above are as follows: STBY state—{000}, MBUSY1 state—{001}, MBUSY2 state—{010}, and DBUSY state—{100}. There is no state corresponding to {111} as will be described later.

As shown in FIG. 9(a), the operation state of the arbiter circuit 8 immediately after resetting is STBY state, and transitions to MBUSY1 state when MSTAT1 rises; thereafter it returns to STBY state when RAMCLK rises. Likewise, the operation state transitions from STBY state to MBUSY2 state when MSTAT2 rises, and thereafter returns to STBY state when RAMCLK rises. Likewise, the operation state transitions from STBY state to DBUSY state when DSTAT rises, and thereafter returns to STBY state when RAMCLK rises.

In this way, the arbiter circuit 8 of this configuration, like that of the first configuration, is so configured that, when its operation state transitions, only one bit (one digit) in the state counter changes; that is, it behaves as a gray code counter. Thus, with the arbiter circuit 8 of this configuration, a transition of its operation state to one non-stand-by state takes place without passing through another non-stand-by state. This prevents erroneous state recognition at the moment of an operation state transition.

Last, the temporal restriction on RAM access (restriction on the period of RAMCLK) in accordance with the maximum operation frequency of the access clocks in the second configuration will be described in detail with reference to FIG. 10. FIG. 10 is a diagram illustrating the temporal restriction on RAM access in accordance with the maximum operating frequency of the access clocks in the second configuration.

The RAM 3 is accessed most frequently when, as shown in FIG. 10, access according to DCLK is requested while successive access according to MCLK is being continued. FIG. 10 shows the worst case in which DCLK rises immediately before MCLK2 rises.

As described previously, the arbiter circuit 8 of this configuration receives MCLK in the form of two divided access clocks MCLK1 and MCLK2 and performs access management individually in accordance with each of them. Thus, in the arbiter circuit 8 of this configuration, even if DCLK rises immediately before MCLK2 rises and access according to MCLK2 is so deferred as not to end before the next input of MCLK1, arbitration is performed between MCLK1 and MCLK2 so that access according to the next MCLK1 can be deferred without any problem. Thus, on completion of the two prior sessions of access, a new session of access according to MCLK1 can be performed.

When successive access according to MCLK continues, as shown in FIG. 10, arbitration between MCLK1 and MCLK2 continues to be performed in a chain of sessions. Even in this case, as described above, access for one side can be performed after waiting for the end of access for the other side. This is repeated until the chain of sessions of arbitration between MCLK1 and MCLK2 ends.

As described above, the arbiter circuit 8 of this configuration can, with respect to successive access according to MCLK, defer access according to a posterior pulse until the end of access according to a prior pulse, and is thus less likely to cause incomplete access.

If, however, a chain of sessions of arbitration between MCLK1 and MCLK2 occurs and, before that ends, the next input of DCLK occurs, even the arbiter circuit 8 of this configuration may fail to cope with the situation competently and cause incomplete access.

To avoid this, and thereby to keep the RAM control device operating normally, it is preferable that the RAM access period W (=d1+d2) be set so as to fulfill formula (1) below.

[Formula 1]

$$Z \leq W \leq \frac{Y}{1 + \frac{Y}{X}} \quad (1)$$

In formula (1) above, X represents the shortest period of MCLK, Y represents the shortest period of DCLK, and Z represents the minimum period at or above which defective access to RAM 3 does not occur.

For example, in a case where X=100 ns, Y=1 000 ns, and Z=40 ns, with the first configuration, the RAM access period W (=d1+d2) needs to be set to fulfill the condition 40 ns≦W≦50 ns; by contrast, with the second configuration, by setting the RAM access period W to fulfill the condition 40 ns≦W≦90.9 ns, it is possible to prevent failure of arbitration.

That is, by adopting the second configuration, it is possible to secure twice as large a margin with respect to the RAM access period W, and thereby to greatly alleviate the restriction on it. Thus, it is possible to competently cope with the ever-increasing frequencies of access clocks.

Although the embodiments described above deal with examples where a single-port RAM is adopted as the RAM3, this is in no way meant to limit the configuration with which the invention is practiced; the invention finds wide application as means for controlling access according to two access clocks with respect to any one of the input/output interfaces of a dual-port RAM.

Moreover, the invention may be practiced in any manner other than specifically described by way of embodiments above, with any modifications and variations made within the spirit of the invention.

For example, although the embodiments described above deal with examples in which the one-shot circuit 2 makes RAMCLK fall to low level when the period d1 passes after a rise in CLKRQ and then makes RAMCLK rise back to high level when the period d2 passes thereafter, this is in no way meant to limit the configuration with which the invention is practiced; instead, CLKRQ (more precisely, in terms of the embodiments, inverted CLKRQ) may simply be delayed by the period d1 to generate a single pulse as RAMCLK. This is possible because CLKRQ has a pulse waveform such that it is turned to high level in accordance with a rise in the access start signal and is turned back to low level in accordance with a fall in RAMCLK; thus, delaying inverted CLKRQ by the period d1 results in generating a single pulse in RAMCLK. In this case, RAMCLK falls to low level when the period d1 passes after a rise in CLKRQ, and rises back to high level when the period d1 passes thereafter. With this configuration, the one-shot circuit 2 can be realized very easily. As described previously, the period d1 is set appropriately to suit the maximum operating frequency of the access clocks.

Although the embodiments described above with reference to FIGS. 7 and 8 deal with examples in which the clock division circuit 7 and the arbiter circuit 8 are provided separately, this is in no way meant to limit the configuration with which the invention is practiced; instead, the clock division circuit may be incorporated into the arbiter circuit.

INDUSTRIAL APPLICABILITY

The present invention is useful in reducing the device scale and cost of RAM control devices.

What is claimed is:

1. A RAM control device comprising an arbiter circuit and a one-shot circuit and configured to control access to a RAM according to first and second asynchronously inputted access clocks, wherein the arbiter circuit is configured for generating first and second busy signals that are logically exclusive with each other according to the first and second access clocks in order to permit whichever host outputs an access clock first to access the RAM and is further configured for requesting the one-shot circuit to generate a RAM clock for deciding timing of access to the RAM, and wherein the one-shot circuit is configured for generating one pulse as the RAM clock according to a clock request signal from the arbiter circuit to feed the pulse to the RAM.

2. The RAM control device according to claim 1, wherein the RAM clock has a period equal to or less than one-half of a period of whichever of the first and second access clocks is faster.

3. The RAM control device according to claim 1, wherein the arbiter circuit comprises:

a first D flip-flop to receive at a clock input terminal thereof the first access clock, to receive at a data input terminal thereof a predetermined logic signal, to receive at a reset terminal thereof a first request reset signal, and to provide at an output terminal thereof a first request signal;

a first AND circuit to receive at a first input terminal thereof the first busy signal, to receive at a second, inverting, input terminal thereof the RAM clock, and to provide at an output terminal thereof the first request reset signal;

a second AND circuit to receive at a first input terminal thereof the first request signal, to receive at a second, inverting, input terminal thereof the second busy signal, and to provide at an output terminal thereof a first access start signal;

a second D flip-flop to receive at a clock input terminal thereof the RAM clock, to receive at a data input terminal thereof a predetermined logic signal, to receive at a set input terminal thereof the first access start signal, and to provide at an output terminal thereof the first busy signal;

a third D flip-flop to receive at a clock input terminal thereof the second access clock, to receive at a data input terminal thereof a predetermined logic signal, to receive at a reset terminal thereof a second request reset signal, and to provide at an output terminal thereof a second request signal;

a third AND circuit to receive at a first input terminal thereof the second busy signal, to receive at a second, inverting, input terminal thereof the RAM clock, and to provide at an output terminal thereof the second request reset signal;

a fourth AND circuit to receive at a first input terminal thereof the second request signal, to receive at a second, inverting, input terminal thereof the first busy signal, and to provide at an output terminal thereof a second access start signal;

a fourth D flip-flop to receive at a clock input terminal thereof the RAM clock, to receive at a data input terminal thereof a predetermined logic signal, to receive at a set input terminal thereof the second access start signal, and to provide at an output terminal thereof the second busy signal; and an OR circuit to receive at a first input terminal thereof the first access start signal, to receive at a second input terminal thereof the second access start signal, and to provide at an output terminal thereof the clock request signal.

4. The RAM control device according to claim 3, configured such that the predetermined logic signals fed to the data input terminals of the first and third D flip-flops are respectively inversions of output signals of the first and third D flip-flops themselves.

5. The RAM control device according to claim 3, configured such that the second D flip-flop receives at a reset terminal thereof the second busy signal, or the fourth D flip-flop receives at a reset terminal thereof the first busy signal.

6. The RAM control device according to claim 1, configured such that, based on whether or not the first and second access clocks are inputted and based on a logic level of the RAM clock, the arbiter circuit judges whether or not, in a state in which an accidental turn has occurred in the busy signal corresponding to one of the first and second access clocks, the other of the first and second access clocks is inputted correctly and, on recognizing that state, the arbiter circuit turns the busy signal corresponding to the other access clock to a desired logic level according to the correctly inputted access clock irrespective of the busy signal in which the accidental turn has occurred.

7. The RAM control device according to claim 6, wherein the arbiter circuit comprises:

a first D flip-flop to receive at a clock input terminal thereof the first access clock, to receive at a data input terminal thereof a predetermined logic signal, to receive at a reset terminal thereof a first request reset signal, and to provide at an output terminal thereof a first request signal;

a first AND circuit to receive at a first input terminal thereof the first busy signal, to receive at a second, inverting, input terminal thereof the RAM clock, and to provide at an output terminal thereof the first request reset signal;

a second AND circuit to receive at a first input terminal thereof the first request signal, to receive at a second, inverting, input terminal thereof the second busy signal, and to provide at an output terminal thereof a first pre signal;

a second D flip-flop to receive at a clock input terminal thereof the RAM clock, to receive at a data input terminal thereof a predetermined logic signal, to receive at a set input terminal thereof the first access start signal, and to provide at an output terminal thereof the first busy signal;

a third D flip-flop to receive at a clock input terminal thereof the second access clock, to receive at a data input terminal thereof a predetermined logic signal, to receive at a reset terminal thereof a second request reset signal, and to provide at an output terminal thereof a second request signal;

a third AND circuit to receive at a first input terminal thereof the second busy signal, to receive at a second, inverting, input terminal thereof the RAM clock, and to provide at an output terminal thereof the second request reset signal;

a fourth AND circuit to receive at a first input terminal thereof the second request signal, to receive at a second, inverting, input terminal thereof the first busy signal, and to provide at an output terminal thereof a second pre signal;

a fourth D flip-flop to receive at a clock input terminal thereof the RAM clock, to receive at a data input terminal thereof a predetermined logic signal, to receive at a set input terminal thereof the second access start signal, and to provide at an output terminal thereof the second busy signal;

an OR circuit to receive at a first input terminal thereof the first access start signal, to receive at a second input terminal thereof the second access start signal, and to provide at an output terminal thereof the clock request signal;

a fifth AND circuit to receive at a first input terminal thereof the first request signal, to receive at a second, inverting, input terminal thereof the second request signal, to receive at a third input terminal thereof the RAM clock, and to provide at an output terminal thereof a first through signal;

a first OR circuit to receive at a first input terminal thereof the first pre signal, to receive at a second input terminal thereof the first through signal, and to provide at an output terminal thereof the first access start signal;

a sixth AND circuit to receive at a first, inverting, input terminal thereof the first request signal, to receive at a second input terminal thereof the second request signal, to receive at a third input terminal thereof the RAM clock, and to provide at an output terminal thereof a second through signal; and a second OR circuit to receive at a first input terminal thereof the second pre signal, to receive at a second input terminal thereof the second through signal, and to provide at an output terminal thereof the second access start signal.

8. The RAM control device according to claim 7 configured such that the predetermined logic signals fed to the data input terminals of the first and third D flip-flops are respectively inversions of output signals of the first and third D flip-flops themselves.

9. The RAM control device according to claim 7 configured such that the second D flip-flop receives at a reset terminal thereof the second busy signal, or the fourth D flip-flop receives at a reset terminal thereof the first busy signal.

10. The RAM control device according to claim 1, further comprising
a clock division circuit in a stage preceding the arbiter circuit to divide the first access clock, which is faster than the second access clock, into two divided access clocks by distributing successive pulses of the first access clock cycle-by-cycle alternately between the divided access clocks,
wherein the arbiter circuit is configured to generate three busy signals according to the two divided access clocks obtained from the first access clock and the second access clock.

11. The RAM control device according to claim 10, wherein the RAM clock has a period such that a chain of sessions of arbitration between the two divided access clocks obtained from the first access clock ends within one period of the second access clock.

12. The RAM control device according to claim 10, wherein the arbiter circuit comprises:
a first D flip-flop to receive at a clock input terminal thereof one of the two divided access clocks obtained from the first access clock, to receive at a data input terminal thereof a predetermined logic signal, to receive at a reset terminal thereof a first request reset signal, and to provide at an output terminal thereof a first request signal;

a first AND circuit to receive at a first input terminal thereof the first busy signal, to receive at a second, inverting, input terminal thereof the RAM clock, and to provide at an output terminal thereof the first request reset signal;

a second AND circuit to receive at a first input terminal thereof the first request signal, to receive at a second, inverting, input terminal thereof the second busy signal, to receive at a third, inverting, input terminal thereof a third busy signal, and to provide at an output terminal thereof a first access start signal;

a second D flip-flop to receive at a clock input terminal thereof the RAM clock, to receive at a data input terminal thereof a predetermined logic signal, to receive at a set input terminal thereof the first access start signal, and to provide at an output terminal thereof the first busy signal;

a third D flip-flop to receive at a clock input terminal thereof the other of the two divided access clocks obtained from the first access clock, to receive at a data input terminal thereof a predetermined logic signal, to receive at a reset terminal thereof a second request reset signal, and to provide at an output terminal thereof a second request signal;

a third AND circuit to receive at a first input terminal thereof the second busy signal, to receive at a second, inverting, input terminal thereof the RAM clock, and to provide at an output terminal thereof the second request reset signal;

a fourth AND circuit to receive at a first input terminal thereof the second request signal, to receive at a second, inverting, input terminal thereof the first busy signal, to receive at a third, inverting, input terminal thereof the third busy signal, and to provide at an output terminal thereof a second access start signal;

a fourth D flip-flop to receive at a clock input terminal thereof the RAM clock, to receive at a data input terminal thereof a predetermined logic signal, to receive at a set input terminal thereof the second access start signal, and to provide at an output terminal thereof the second busy signal;

a fifth D flip-flop to receive at a clock input terminal thereof the second access clock, to receive at a data input terminal thereof a predetermined logic signal, to receive at a reset terminal thereof a third request reset signal, and to provide at an output terminal thereof a third request signal;

a fifth AND circuit to receive at a first input terminal thereof the third busy signal, to receive at a second, inverting, input terminal thereof the RAM clock, and to provide at an output terminal thereof the third request reset signal;

a sixth AND circuit to receive at a first input terminal thereof the third request signal, to receive at a second, inverting, input terminal thereof the first busy signal, to receive at a third, inverting, input terminal thereof the second busy signal, and to provide at an output terminal thereof a third access start signal;

a sixth D flip-flop to receive at a clock input terminal thereof the RAM clock, to receive at a data input terminal thereof a predetermined logic signal, to receive at a set input terminal thereof the third access start signal, and to provide at an output terminal thereof the third busy signal; and a first OR circuit to receive at a first input terminal thereof the first access start signal, to receive at a second input terminal thereof the second access start signal, to receive at a third input terminal thereof the third access start signal, and to provide at an output terminal thereof the clock request signal.

13. The RAM control device according to claim 12 configured such that the predetermined logic signals fed to the data input terminals of the first, third, and fifth D flip-flops are respectively inversions of output signals of the first, third, and fifth D flip-flops themselves.

14. The RAM control device according to claim 12 configured such that the second and fourth D flip-flops receive at reset terminal thereof the third busy signal, or the sixth D flip-flop receives at a reset terminal thereof an OR signal of the first and second busy signals.

15. The RAM control device according to claim 10, wherein the arbiter circuit incorporates the clock division circuit.

16. A memory device comprising:
the RAM control device according to claim 1; and
a RAM operating in accordance with the RAM clock.

* * * * *